July 6, 1948.
G. R. LAKE
2,444,893
RECOVERY OF METHYL ETHYL KETONE FROM
AZEOTROPIC DISTILLATES BY EXTRACTION
WITH TETRA-ETHYLENE GLYCOL
Filed Oct. 18, 1941
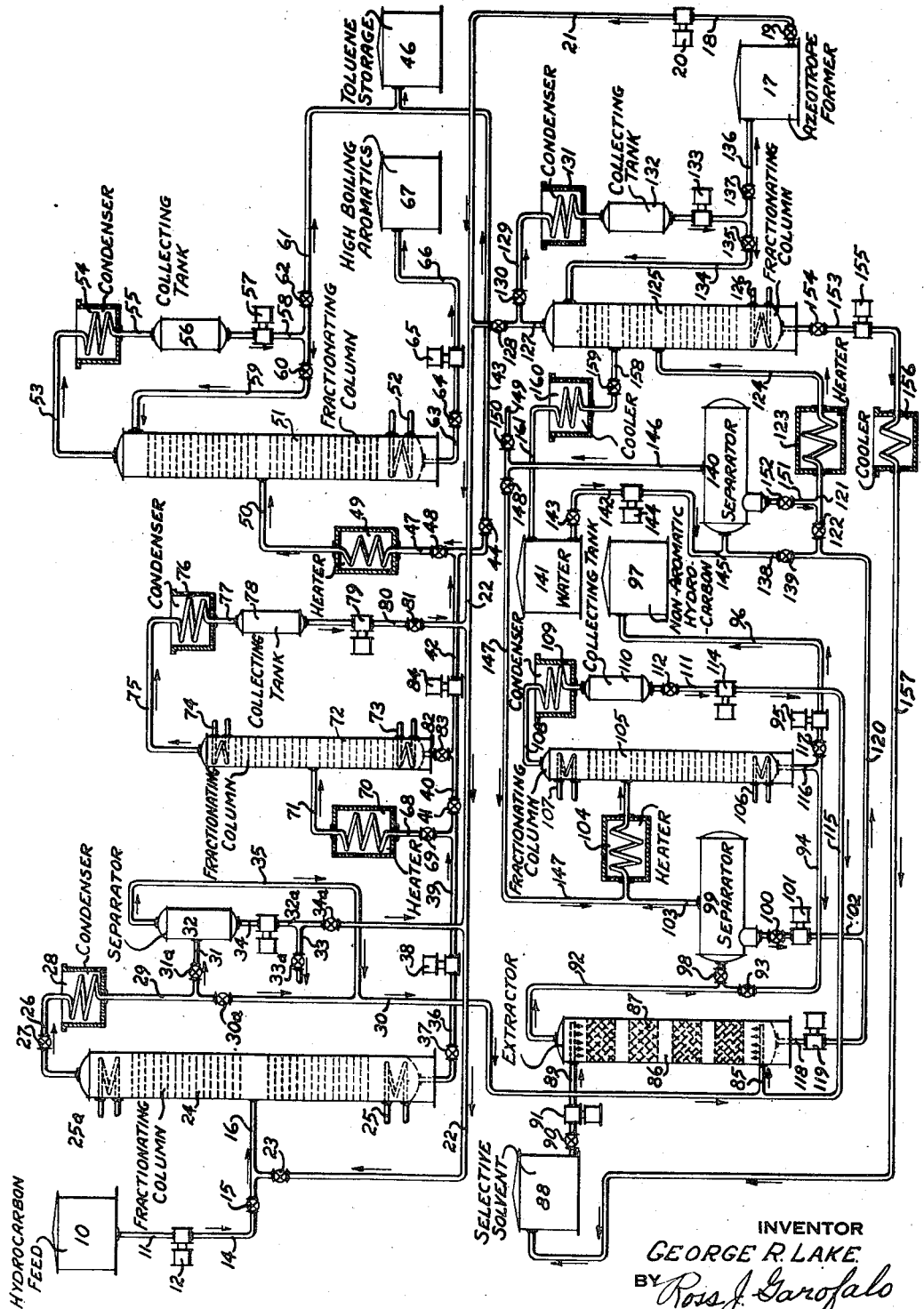
INVENTOR
GEORGE R. LAKE
BY Ross J. Garofalo
ATTORNEY Patented July 6, 1948

2,444,893

UNITED STATES PATENT OFFICE 2,444,893

RECOVERY OF METHYL ETHYL KETONE FROM AZEOTROPIC DISTILLATES BY EXTRACTION WITH TETRAETHYLENE GLYCOL

George R. Lake, Long Beach, Calif., assignor to Union Oil Company of California, Los Angeles, Calif., a corporation of California Application October 18, 1941, Serial No. 415,567

2 Claims. (Cl. 202—42)

This invention relates to a process of azeotropic distillation to prepare pure hydrocarbons from complex petroleum fractions which are difficult to separate by ordinary fractional distillation due to the small differences in boiling points of the hydrocarbons contained in the petroleum fraction. The invention is particularly directed to an improved process for separating the hydrocarbons and the azeotrope former that are contained in the azeotropic distillate produced by the azeotropic distillation.

The process of separating one hydrocarbon component from another hydrocarbon component of substantially the same boiling point contained in a complex hydrocarbon fraction by azeotropic distillation is well known. This process consists in distilling the hydrocarbon fraction in the presence of an extraneous substance which has a preferential affinity for one of the components contained in the complex hydrocarbon fraction, thus causing a disturbance of the vapor pressure equilibrium that formerly existed in the fraction in such manner that the partial vapor pressure or fugacity of at least one component in the fraction is changed sufficiently to permit its separation by controlled fractional distillation. In such processes, the distillation effects the separation of the relatively more paraffinic hydrocarbons together with the extraneous substance leaving as undistilled bottoms the relatively less paraffinic hydrocarbons which may or may not contain a portion of the extraneous substance. In the present description of my invention the aforesaid type of fractional distillation will be referred to as azeotropic distillation, the extraneous substance or substances which are added to the complex hydrocarbon fraction to effect the aforementioned change will be referred to as azeotrope formers and the overhead from the azeotropic distillation will be referred to as the azeotropic distillate.

One of the main difficulties in the azeotropic distillation process is in the separation or recovery of the azeotrope former from the hydrocarbons contained in the azeotropic distillate. One of the methods proposed for this purpose resides in washing the azeotropic distillate with water which is adapted to dissolve the azeotrope former from the azeotropic distillate and thus be separated from the hydrocarbons by settling and stratification. The solution of azeotrope former and water may be distilled to separate the azeotrope former from the water.

However, difficulty has been experienced to separate the azeotrope former substantially completely from the azeotropic distillate by washing with water since in many cases, the azeotrope former has a preferential solubility in the hydrocarbons as compared with the solubility in the water. The result is that the hydrocarbons must be washed with an excessively large amount of water in order to remove the last traces of the azeotrope former so that the hydrocarbons may be utilized and the azeotrope former recovered without sustaining a substantial loss of this more valuable material. To illustrate, it has been found that methyl ethyl ketone, particularly containing about 10% by volume of water, is a very efficient azeotrope former to effect the separation of non-aromatic hydrocarbons from a hydrocarbon fraction containing toluene. Yet the use of this azeotrope former offers the serious difficulty of recovering the methyl ethyl ketone from the azeotropic distillate. While the separation of the methyl ethyl ketone may be accomplished by washing with water, this has required about five or six volumes of water for each volume of azeotropic distillate. Even by washing the azeotropic distillate with this large amount of water, the hydrocarbons thus separated still contained about one percent of methyl ethyl ketone. Furthermore, in order to recover the methyl ethyl ketone from the very dilute wash solution, it is necessary to heat an excessively large volume of dilute methyl ethyl ketone.

It is thus an object of my invention to effect a substantially complete separation of the azeotrope former from the hydrocarbons contained in the azeotropic distillate and it is a particular object to effect the aforesaid separation in an efficient and economical manner without loss of azeotrope former.

It is a further object of my invention to effect the separation of the azeotrope former from the azeotropic distillate by the use of selective solvents having a preferential solubility for the azeotrope former than for the hydrocarbons contained in the azeotropic distillate. A further object is to effect the separation with the use of a smaller amount of the selective solvent than required when using water for this purpose.

I have discovered that a substantially complete separation of the azeotrope former from the azeotropic distillate may be accomplished by the use of selective solvents having a preferential solubility for the azeotrope former than for the hydrocarbons. Thus, the separation according to my invention may be accomplished by simply intimately contacting or mixing the azeotropic distillate with a sufficient amount of selective solvent at a suitable temperature to enable the selective solvent to dissolve or extract the azeotrope former, allowing the mixture to settle and stratify into two layers, generally, an upper layer of the hydrocarbons and a lower layer of the azeotrope former dissolved in the selective solvent and withdrawing one layer from the other layer.

To illustrate the advantage of employing a selective solvent for effecting the separation of the azeotrope former from the azeotropic distillate, an azeotropic distillate of hydrocarbons and methyl ethyl ketone of identical composition as that described above which was washed with water, was extracted with tetra ethylene glycol employing only about three volumes of the solvent to one of the azeotropic distillate. The hydrocarbons thus recovered were substantially free from methyl ethyl ketone. Thus, it is possible by my invention to produce a hydrocarbon fraction which is free of azeotrope former by employing a considerably less amount of the solvent than when the azeotropic distillate is extracted with water.

Besides tetra ethylene glycol mentioned above, selective solvents which I have found suitable to effect the extraction of azeotrope formers from azeotropic distillates include phenolic compounds such as resorcinol, para-chlorophenol, phenol, xylenol, pyrogallol, pyrocatechol and cresylic acid, polyhydric alcohols such as di-, tri-, tetra- and hexaethylene glycols and dipropylene glycol, amines such as mono-, di-, and tri-ethanolamine, 2-methyl propanol amine, diethylene triamine, triethylene tetramine, tetra-ethylene pentamine, diethylene diamine, tri-ethylene triamine, diphenylamine, xylidine, aniline, ortho phenylene diamine, alpha naphthol amine and phenyl hydrazine, fatty acids such as acetic, propionic and formic acids, aliphatic alcohols such as methyl, ethyl, isopropyl, tertiary butyl and normal propyl alcohols, ketones such as methyl ethyl ketone and acetone, cyclic ketones such as cyclohexanone, alkyl ethers of polyglycols such as mono ethyl ether of diethylene glycol and ethyl ether of ethylene glycol, heterocyclic compounds such as furfuryl alcohols, tetrahydro furfuryl alcohol, dioxane, morpholine, piperidine and thiophene, nitroparaffins such as nitromethane, nitroethane and nitropropane.

In addition to the above, aromatic hydrocarbon solvents may be employed to effect the desired separation since the azeotrope formers have a greater affinity for these hydrocarbons than they have for the relatively non-aromatic hydrocarbons contained in the azeotropic distillate. Aromatic hydrocarbon solvents useful for the purpose include benzene, toluene, xylenes, etc.

Of the above selective solvents, I have found the polyhydric alcohols such as di-, tri- and tetra ethylene glycols, amines such as mono- and tri-ethanolamine and diethylene triamine, and also resorcinol and nitromethane to be particularly efficient for extracting such azeotrope formers as methyl ethyl ketone and methanol from azeotropic distillates containing non-aromatic hydrocarbons having a boiling range of 200 to 240° F.

Azeotrope formers which may be separated according to my invention from azeotropic distillates produced by azeotropic distillation include all of the compounds disclosed above as selective solvents for separating the azeotrope former from the azeotropic distillate. However, in effecting a separation of the azeotrope former from an azeotropic distillate, it is obvious that the same material should not be employed as a selective solvent as was employed to effect the azeotropic distillation. Whether a particular material will function as a selective solvent to separate the azeotrope former from the azeotropic distillate depends upon the character of the azeotropic distillate such as the boiling point and solubility characteristics of the hydrocarbons and of the azeotrope former contained therein. For example, a compound may be efficient to perform the azeotropic distillation to separate hydrocarbons from a particular complex hydrocarbon fraction and may be inefficient to separate hydrocarbons from a complex hydrocarbon fraction of a different boiling point; yet this same compound may be useful as a selective solvent to separate a different azeotrope former from the azeotropic distillate produced from such complex hydrocarbon fraction of different boiling point. To illustrate specifically, tetra ethylene glycol is a particularly efficient azeotrope former for separating relatively paraffinic hydrocarbons in the lubricating oil boiling range from the relatively non-paraffinic oil fractions and is of less efficiency for separating non-aromatic hydrocarbons from a toluene fraction. However, the tetra ethylene glycol is an efficient selective solvent for removing an efficient azeotrope former such as methyl ethyl ketone from the azeotropic distillate obtained from the azeotropic distillation of a toluene fraction.

In selecting a selective solvent for the separation of azeotrope former from a particular azeotropic distillate, it is preferable to choose one which has a materially different boiling point, either higher or lower, than that of the azeotrope former so that the separation of the azeotrope former and selective solvent from each other may be readily accomplished by simple fractional distillation.

Other objects, features and advantages of my invention will be apparent to those skilled in the art from the following description of the invention which represents a diagrammatic arrangement of apparatus for carrying out my invention. In the following example, the invention will be described as applied to the separation of toluene from a hydrocarbon fraction employing methyl ethyl ketone containing about 10% by volume of water. However, it will be observed that this example is not to be taken as limiting my invention since the process is applicable to separate other components from complex substances employing other azeotrope formers under conditions adapted to effect the desired separation.

In the drawing, the hydrocarbon feed to be resolved into its component parts, preferably one having a narrow boiling range, not more than 50° F., such as for example, a hydrocarbon fraction having a boiling range of about 200 to 240 F. and consisting of substantially 45% by volume of toluene, 6% by volume of olefins and the remainder, paraffin and naphthene hydrocarbons, obtained by fractionation of a catalytically reformed gasoline is taken from tank 10 via line 11 and is pumped by pump 12 through line 14 controlled by valve 15 into line 16. Azeotrope former, such as methyl ethyl ketone, containing about 10% water, is taken from tank 17 via line 18 controlled by valve 19 and is pumped by pump 20 through lines 21 and 22 and valve 23 into line 16 where it is mixed with the hydrocarbon feed from tank 10. The mixture of hydrocarbon feed and azeotrope former in the ratio of approximately two parts of the azeotrope former and one part of hydrocarbon feed in the example herein given, is passed into fractionating column 24 where the mixture is subjected to fractionation, heat being supplied by closed steam coil 25. If desired, the azeotrope former may be introduced directly into the fractionating column at any other point as near the top of the column in which case it will act in part as reflux for the fractionation or reflux may be obtained by cooling coil 25a. In the fractionating column, the distillation is controlled so as to distill overhead an azeotrope consisting of the paraffin, olefin and naphthene hydrocarbons together with substantially all of the methyl ethyl ketone and water. In the example herein given, this is accomplished at an overhead temperature of approximately 160–170° F. and at atmospheric pressure. If desired, the azeotropic distillation may be carried out either at atmospheric or super-atmospheric pressure or under a vacuum.

The type of distillation to be used depends somewhat on the quantity of the azeotrope former used. I may distill over any proportion of the petroleum fraction to be subjected to azeotropic distillation that I desire by adjusting the quantity of azeotrope former. Thus, by employing a relatively small proportion of the azeotrope former, it is possible to distill overhead a portion of the relatively non-aromatic hydrocarbons and leave a portion as bottoms with the relatively aromatic hydrocarbons, or by employing a relatively larger amount of the azeotrope former, it is possible to distill all of the relatively non-aromatic hydrocarbons and a portion of the relatively aromatic hydrocarbons, leaving relatively aromatic hydrocarbons as still bottoms.

The overhead mixture is removed from the fractionating column via line 26, controlled by valve 27, condensed in condenser 28 and passed via line 29 into line 30 controlled by valve 30a to the methyl ethyl ketone-water recovery system, as will be described hereinafter. In some cases, depending upon the hydrocarbon feed and the character and composition of the azeotrope former, the azeotropic distillate obtained in line 26 will separate into two phases when properly cooled. In the case of the example herein described, cooling of the azeotropic distillate to about 50–70° F., the condensate will separate when allowed to settle into an upper phase comprising the bulk of the azeotropic distillate and consisting of substantially all of the hydrocarbons and most of the methyl ethyl ketone and a lower phase consisting of substantially all of the water containing the remainder of the methyl ethyl ketone. In such case, it is preferable to pass the cooled azeotropic condensate from condenser 28 through lines 29 and 31 controlled by valve 31a into a separator 32 where the mixture is allowed to stratify into the two layers. The lower layer is withdrawn via line 34 and passed by pump 32a via line 33 controlled by valve 33a to a recovery system for the recovery of the methyl ethyl ketone, as will be described hereinafter. The upper layer is withdrawn via line 35 and passed via line 30 to the methyl ethyl ketone recovery system.

Certain azeotrope formers such as tetra ethylene glycol employed for the separation of high boiling paraffinic hydrocarbons such as lubricating oil fractions will substantially completely separate into an upper phase of hydrocarbons containing very small, if any, azeotrope former and a lower layer of azeotrope former containing very little, if any, hydrocarbons. In such cases, it may be desired to effect a separation of the two phases in separator 32 and recycle the lower phase to the azeotropic distillation in 24 as by line 34, pump 32a and lines 22 and 16. In some cases, the azeotropic distillation as noted above, may be carried out to distill overhead all of the relatively paraffinic hydrocarbons together with a portion of the relatively non-paraffinic hydrocarbons, particularly the lower boiling non-paraffinic hydrocarbons. In this case, the cooling of the azeotropic distillate may be controlled to separate it into two phases consisting of an upper phase of the relatively paraffinic hydrocarbons and a lower layer of the relatively non-paraffinic hydrocarbons dissolved in the azeotrope former. The latter may be separated from the upper phase and the relatively non-paraffinic hydrocarbons recovered therefrom.

The bottoms in the fractionating column 24 consisting of the aromatic fraction or toluene are withdrawn via line 36 controlled by valve 37 and are pumped by pump 38 through line 39. If the hydrocarbon feed to the azeotropic distillation has been carefully fractionated to produce a fraction free from aromatic hydrocarbons other than toluene and if the azeotropic distillation has been carried out under such conditions as to remove all of the non-aromatic hydrocarbons and azeotrope former, the bottoms from the fractionating column may be passed directly via lines 36, 39, 40 controlled by valve 41, 42, 43 controlled by valve 44 and 45 into storage tank 46. However, in the event the charging stock has not been carefully fractionated to remove aromatic hydrocarbons heavier than toluene, such as xylene, etc., the bottoms in the fractionating column 24 will contain all or substantial amounts of such aromatic hydrocarbons. In the event it is desired to recover the aromatic hydrocarbon mixture per se, it is passed directly to tank 46 as described above. However, if it is desired to separate the toluene from the remaining aromatic hydrocarbons, the bottoms are passed via lines 36, 39, 40, 42 into line 47 controlled by valve 48 from which it passes through heater 49 and line 50 into fractionating column 51 where the mixture is fractionated to remove the toluene as an overhead product aided by heat from the heater 52. The vaporized toluene is removed from the top of the fractionating column 51 via line 53, condensed in condenser 54 and passed via line 55 into collecting tank 56. The condensate may be withdrawn from the collecting tank by pump 57 and passed into line 58. If desired, part of the condensate may be cycled via line 59 controlled by valve 60 to the fractionating column 51 to serve as reflux for the fractionation. The remaining portion is passed via line 61 controlled by valve 62 through line 45 into storage tank 46. The bottoms from the fractionating column, consisting of xylene or a mixture of xylene and higher boiling aromatic hydrocarbons, is withdrawn via line 63 controlled by valve 64 and pumped by pump 65 and line 66 into storage tank 67.

In the event the bottoms fraction from the fractionating column 24 contains a portion of the azeotrope former, this may be removed by passing the bottom fraction via lines 36, 39 and 68 controlled by valve 69 through heater 70 and line 71 into fractionating column 72 provided with a heater 73 and reflux cooling coil 74 where the azeotrope former may be fractionated and removed via line 75, condensed in condenser 76 and passed via line 77 into collecting tank 78 from which it may be returned to the fractionating column 24 by pump 79 and line 80 controlled by valve 81 and lines 22 and 16. The bottoms from the fractionating column 72 may be passed via line 82 controlled by valve 83 into line 42 from which it may be passed by pump 84 either directly to the storage tank 46 or to fractionating column 51 in accordance with the above disclosure.

The toluene or the mixture of toluene and higher boiling aromatic hydrocarbons obtained in tank 46 and the higher boiling aromatic hydrocarbons obtained in tank 67 may be treated with clay which may be accomplished at a temperature of about 230° F. employing 1 to 5 pounds of clay per barrel of the hydrocarbon fraction. If desired, the clay treatment may precede the fractionation in fractionating column 51 in which case the fractionation in 51 may serve either to rerun the clay treated stock and/or to fractionate the high boiling aromatic hydrocarbons from the toluene. In place of clay treatment, the aromatic fraction may be cooled and then treated with 1 to 10 pounds of sulfuric acid per barrel of the hydrocarbons followed by neutralization with clay or caustic alkali. The acid treatment serves to remove small traces of undesirable unsaturated hydrocarbons which may be detrimental in color stability and nitration of the toluene.

In order to recover the azeotrope former from the azeotropic distillate either as a total fraction as that passing through valve 30a or as a portion thereof as passing through line 35, the mixture is passed via line 85 into extractor 86 which is provided with packing material, such as broken tile 87 where it is countercurrently contacted with a selective solvent adapted to extract the methyl ethyl ketone and water from the mixture. The selective solvent is obtained from tank 88 and passed via line 89 controlled by valve 90 and pumped by pump 91 into the extractor 86. As selective solvents adapted for the purpose, tetra ethylene glycol is particularly suitable when used in about two volumes to one of the azeotropic distillate at about atmospheric temperature.

The non-aromatic hydrocarbons, if relatively free of azeotrope formers, are withdrawn from the top of the extractor 86 via line 92 and are passed through valve 93 and line 94 and are pumped by pump 95 through line 96 into storage tank 97. If these hydrocarbons contain selective solvent, they may be subjected to fractionation for the recovery of the selective solvent. In the event the non-aromatic hydrocarbons contain azeotrope formers and suspended selective solvent, it is preferable to pass the mixture via valve 98 into a separator 99 when the suspended selective solvent settles and is withdrawn via valve 100 and pumped by pump 101 into line 102. The hydrocarbons containing an azeotrope former in solution is passed via line 103 through heater 104 into fractionating column 105 provided with heating coil 106 and reflux cooling coil 107 where they are subjected to fractionation to remove remaining traces of the methyl ethyl ketone and water and also a portion of the non-aromatic hydrocarbons. These pass via line 108, condensed in condenser 109 and collected in collecting tank 110 from which the condensate may be passed via line 111 controlled by valve 112 and pumped by pump 114 through lines 115 and 85 into extractor 86 where the mixture is re-extracted. The bottoms from the fractionating column 105 consisting of non-aromatic hydrocarbons are withdrawn via line 116 and passed via line 96 controlled by valve 117 and pumped by pump 95 into storage tank 97.

The solution of selective solvent, water and methyl ethyl ketone is withdrawn via line 118 and pumped by pump 119 into line 120 together with the selective solvent passing through line 102. This mixture is passed via line 121 controlled by valve 122, through heater 123 and line 124 into fractionating column 125 provided with heater 126 where the mixture is fractionated to separate the azeotrope former which may consist of the methyl ethyl ketone containing about 10% by volume of water as an overhead vapor which may be passed via line 127 controlled by valve 128 and lines 22 and 16 to the azeotropic distillate in fractionating column 24 or the overhead may be passed via line 129 controlled by valve 130, condensed in condenser 131 and collected in collecting tank 132. The condensate is withdrawn from the bottom of the collecting tank by pump 133 and part thereof may be passed via line 134 controlled by valve 135 to fractionating column 125 to serve as reflux for the fractionation. The remaining portion of the condensate is passed via line 136 controlled by valve 137 into storage tank 17.

The extraction in extractor 86 with certain selective solvents such as, for example, tetra ethylene glycol, may extract some of the hydrocarbons together with the azeotrope former, such hydrocarbons being the relatively less paraffinic hydrocarbons such as the naphthenes. In such case, the bottoms from the extractor 86 may be passed via line 138 controlled by valve 139 into a separator or rejector 140 where the hydrocarbons contained in the mixture may be separated from the selective solvent and azeotrope former. This is accomplished by passing water from tank 141 through line 142 controlled by valve 143 and pumped by pump 144 through line 145 where it is mixed with the bottoms from the extractor 86 and passed into the separator 140. The water causes the mixture to separate into two phases. The upper phase of hydrocarbon oil may be recycled via lines 146 and 147 controlled by valve 148 and through heater 104 into fractionating column 105 where any traces of azeotrope former may be removed in which case these hydrocarbons are commingled with the hydrocarbons from extractor 86 and passed into storage tank 97. If it is desired to recover the hydrocarbons of intermediate paraffinicity, these may be passed to suitable storage via line 149 controlled by valve 150. The lower phase in the separator 140 consisting of the selective solvent, azeotrope former and water is withdrawn via line 151, controlled by valve 152 and passed to the fractionating column 125 where the azeotrope former is separated from the selective solvent as described above. The selective solvent is withdrawn from the bottom of the fractionating column 125 via line 153 controlled by valve 154 and is pumped by pump 155 through cooler 156 and line 157 to storage tank 88. When employing the hydrocarbon rejection with water in separator 140, it is preferable to provide the fractionating column 125 with a draw-off line 158 provided with valve 159 from which the water may be passed through cooler 160 and line 161 to water storage tank 141.

As indicated above, the lower layer in separator 32 passing through line 33 consisting of the greater portion of the water and containing methyl ethyl ketone may also be passed into the fractionating column 125 for the recovery of the azeotrope former as described above.

It has been found in some cases, particularly when treating higher boiling hydrocarbon fractions, such as those boiling in the lubricating oil, Diesel oil and spray oil range by azeotropic distillation, that the azeotropic distillate may be cooled under controlled conditions to separate first the more paraffinic oil fractions and then the less paraffinic oil fractions from the azeotrope former. Thus, in the drawing, this is accomplished by controlling the temperature in condenser 2C so that the separation in separator 32 permits the separation of an upper layer of the more paraffinic oil fractions, leaving the less paraffinic oil fraction dissolved in the azeotrope former as a lower layer. By cooling the latter further and settling, the less paraffinic oil fraction may be stratified from the azeotrope former. If desired, the latter separation of the mixture of azeotrope former and relatively less paraffinic oil fractions may be accomplished by passing the mixture into the separator 140 where it may be mixed with water from tank 141 as described above.

The use of methyl ethyl ketone as an azeotrope former is specifically claimed in my prior abandoned application Serial No. 360,264, filed October 8, 1940.

The foregoing description of my invention is not to be taken as limiting my invention but only as illustrative thereof since many variations may be made by those skilled in the art without departing from the scope of the following claims.

I claim:

1. In a process for the treatment of a hydrocarbon fraction containing toluene and non-aromatic hydrocarbons to separate toluene from the non-aromatic hydrocarbons contained therein which ordinarily distill from said hydrocarbon fraction in the same temperature range as toluene distills therefrom which comprises azeotropically distilling said hydrocarbon fraction in the presence of a sufficient amount of methyl ethyl ketone to vaporize the non-aromatic hydrocarbons together with the methyl ethyl ketone thereby leaving toluene in the residue substantially completely separated from the hydrocarbons other than toluene, the steps of extracting by solution of the methyl ethyl ketone in said vaporized mixture in an extraction zone in countercurrent with an amount of tetra ethylene glycol sufficient to dissolve said methyl ethyl ketone and separating a solution of said tetra ethylene glycol and methyl ethyl ketone from said non-aromatic hydrocarbons.

2. In a process for the treatment of a complex hydrocarbon fraction to separate chemically similar hydrocarbon components therefrom from other hydrocarbon components contained therein which ordinarily distill from the hydrocarbon fraction in the same temperature range as said chemically similar hydrocarbon components distill therefrom which comprises azeotropically distilling said complex hydrocarbon fraction in the presence of a sufficient amount of methyl ethyl ketone to vaporize at least one of the components contained therein together with the methyl ethyl ketone thereby leaving at least one of the components contained in said complex hydrocarbon fraction in the residue, the steps of extracting by solution of the methyl ethyl ketone in said vaporized mixture in an extraction zone in countercurrent with an amount of tetraethylene glycol sufficient to dissolve said methyl ethyl ketone and separating a solution of said tetraethylene glycol and methyl ethyl ketone from said hydrocarbon component.

GEORGE R. LAKE.

REFERENCES CITED

The following references are of record in the file of this patent:

UNITED STATES PATENTS

| Number | Name | Date |
| --- | --- | --- |
| 1,079,004 | Golodetz | Nov. 18, 1913 |
| 1,866,800 | Deanesly | July 12, 1932 |
| 2,085,546 | Roelfsema | June 29, 1937 |
| 2,212,810 | Field | Aug. 27, 1940 |
| 2,265,220 | Sullivan | Dec. 9, 1941 |
| 2,290,636 | Deanesly | July 21, 1942 |
| 2,333,856 | Gerhold | Nov. 9, 1943 |
| 2,360,655 | Deanesly | Oct. 17, 1944 |
| 2,370,063 | Nutting et al. | Feb. 20, 1945 |
| 2,388,040 | Clark | Oct. 30, 1945 |

OTHER REFERENCES

Perry Chemical Engineer Handbook, 2d edition, page 1214.